United States Patent [19]
Matthews

[11] Patent Number: 5,280,268
[45] Date of Patent: Jan. 18, 1994

[54] AUTO ANTI-THEFT SYSTEM

[76] Inventor: Edward J. Matthews, P.O. Box 174, Ascutney, Vt. 05030

[21] Appl. No.: 883,950

[22] Filed: May 15, 1992

[51] Int. Cl.⁵ ............................................. B60R 25/10
[52] U.S. Cl. ................................ 340/428; 340/425.5; 340/426; 307/10.2; 307/10.3
[58] Field of Search ............ 340/426, 428, 541, 425.5; 180/287; 116/214; 307/10.2, 10.3

[56] References Cited

U.S. PATENT DOCUMENTS

| | | |
|---|---|---|
| 3,703,703 | 11/1972 | Payne . |
| 3,756,341 | 9/1973 | Tonkowich et al. ............... 180/287 |
| 3,828,341 | 8/1974 | Carter, Jr. et al. ................. 340/571 |
| 3,834,484 | 9/1974 | Sangster ............................ 180/287 |
| 4,267,889 | 5/1981 | Williams ........................... 340/506 |
| 4,301,441 | 11/1981 | Baxter . |
| 4,463,340 | 7/1984 | Adkins et al. ..................... 340/428 |
| 4,888,575 | 12/1989 | De Vaulx . |
| 4,958,142 | 9/1990 | Sayers . |
| 5,041,810 | 8/1991 | Gotanda ............................ 340/426 |
| 5,182,541 | 2/1992 | Bajorek et al. .................... 340/541 |

Primary Examiner—Jin F. Ng
Assistant Examiner—Daniel J. Wu
Attorney, Agent, or Firm—Richard C. Litman

[57] ABSTRACT

A vehicle security system has a combination lock type switch which controls engine starting and at least one other critical engine function; activates an alarm; and which causes an incapacitating substance, such as tear gas, to be introduced to the vehicle interior. The combination lock type switch controls appropriate solenoid valves and switches to accomplish the above purposes. This combination switch, a replenishing port, and a visible alarm are the only visible components. The remaining components are concealed behind the dashboard or beneath the floor of the vehicle.

10 Claims, 3 Drawing Sheets

AUTO ANTI-THEFT SYSTEM

FIELD OF THE INVENTION

The present invention relates to a security system for preventing unauthorized use of a vehicle, particularly having the ability to inhibit engine operation and also to partially disable an unauthorized user.

Prior art attempts to achieve vehicle security have generally relied on disabling the vehicle; activating audible or visual alarms or both; or occasionally to partially incapacitate a would-be thief. It is rare that a single security system provides all three aspects of security. Those that do, and even many that provide two or only one of these aspects, generally rely on complicated apparatus and on sensitive electronics. U.S. Pat. Nos. 3,703,703, issued on Nov. 21, 1972 to Sumas Payne; 4,301,441, issued on Nov. 17, 1981 to Benjamin Baxter; 4,888,575, issued on Dec. 19, 1989 to Louis De Vaulx; and 4,958,142, issued on Sep. 18, 1990 to Carol L. Sayers illustrate various facets of the features discussed above.

SUMMARY OF THE INVENTION

The present invention provides means to selectively enable and disable the engine; to activate an audible and visual alarm; and to partially incapacitate a would-be thief. It also provides a simple initiating device which uses a personal code. This device comprises a combination switch which completes electrical circuits to other controls to achieve the remaining functions. The enablement devices respectively permit electrical continuity to the engine ignition system or permit liquid fuel to be supplied to the engine. An attempt at unauthorized use disables the engine, activates the alarms, and causes an incapacitating substance, such as tear gas, to be discharged into the vehicle. The initiating device disables the alarms, deactivates the incapacitation means, and enables the engine to run. Means are also provided to recharge the incapacitating substance without discharge into the vehicle.

Accordingly, one of the objects of the present invention is to provide a vehicle security system having, in combination, selective enabling or disabling of the engine; an audible and visual alarm; and partial incapacitation means.

A second object is to provide a vehicle security system activated by a simply operated, user code responsive device which does not rely on a key or other enabling device separate from the vehicle.

Another object is to provide a vehicle security system which uses hard wired mechanical or electromechanical components.

Yet another object is to provide a vehicle security system which permits recharging of the incapacitating substance without disassembly or partial disassembly of concealed or inaccessible components of the vehicle, and which also permits such recharging without discharge of the substance into the vehicle.

With these and other objects in view which will more readily appear as the nature of the invention is better understood, the invention consists in the novel combination and assembly of parts hereinafter more fully described, illustrated, and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENTS

Figure 1:
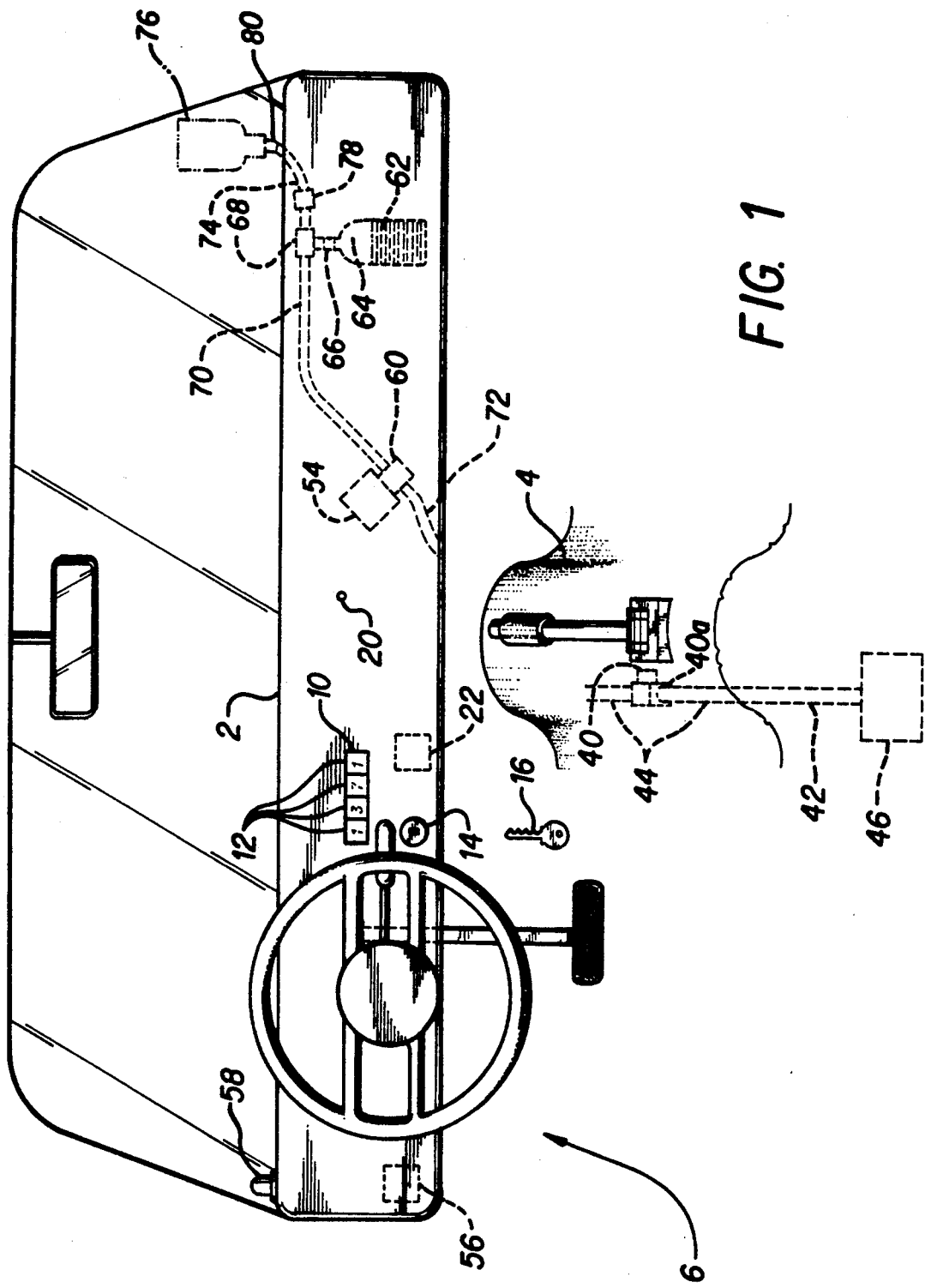
FIG. 1 is a partial interior view of an automobile, showing system components in their concealed locations.
Figure 2:
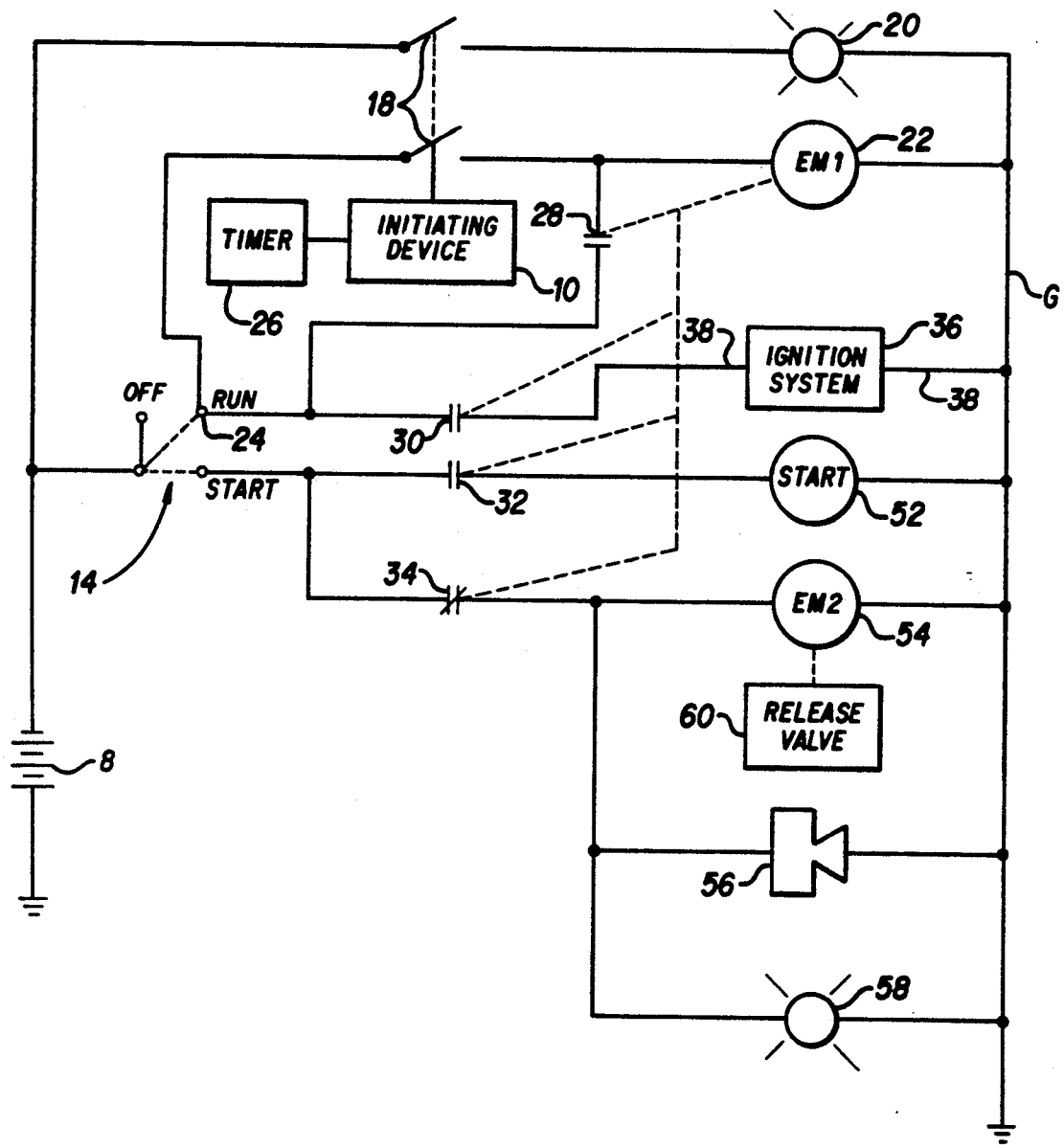
FIG. 2 is a schematic layout of the electrical circuitry of the preferred embodiment.

The vehicle security system described herein comprises certain components, most of which are concealed behind a dashboard 2 or beneath a raised floor portion 4 of the interior 6 of a vehicle (not shown in its entirety). Power to operate electrical components is taken from the vehicle storage battery 8, shown only in FIG. 2 of the schematic diagrams. The location within the vehicle of system components is shown in FIG. 1; their function is best understood by referring to the schematic of FIG. 2.

The security system of the present invention requires a user to follow a prearranged procedure to operate the vehicle. Failure to follow this prearranged procedure will activate the several provisions of the system to disable both the vehicle and the unauthorized vehicle user. The prearranged procedure comprises setting a combination type initiating device 10 to a known enabling combination, followed by conventional operation of the vehicle.

An initiating device 10 is operated by manipulating each element 12 of a plurality of such elements 12 so that a particular combination of elements 12, already known to the vehicle user, actuates a switch portion 18 of the initiating device 10. These elements 12 may be pushbuttons, dial facets, or any other type of equipment which may indicate a number or other identifying indicia which enables a combination to appear to the user.

Unlike an ignition switch 14 which relies on a key 16 or an equivalent apparatus which is removed from the ignition switch 14 when the vehicle is not in use, the initiation device 10 is operated by manipulation. No apparatus separate and removable from the initiating device 10 is required.

The initiating device 10 completes an electrical circuit to an indicating lamp 20 and a second circuit energizing a relay EM1 22. The circuit to the indicating lamp 20 originates at the battery 8. The second circuit obtains power from a terminal 24 in the ignition switch 14 energized in the "Run" position.

The initiating device 10 incorporates a timer 26 operating to return the initiating device 10 to its original configuration after a preset time interval, thus breaking power to the indicating lamp 20 (power to relay EM1 22 being maintained by holding contacts 28 as explained below).

The relay EM1 22 has first, second, and third sets of normally open contacts 28,30,32, and a set of normally closed contacts 34. The first and second sets of normally open contacts 28,30 complete circuits deriving power from the ignition switch terminal 24 energized in the "Run" position. The first set of normally open contacts 28 provides a holding circuit maintaining the relay EM1 22 energized after the timer 26 causes the initiating device 10 to break power to the relay EM1 22. The relay EM1 22 is deenergized when the ignition switch 14 is moved to an "Off" position and also if moved to a "Start" position.

The second set of normally open contacts 30 provides engine inhibition when open. When closed, the second set of normally open contacts 30 completes a partial circuit 38 supplying necessary power to an ignition system 36, this embodiment being shown only in FIG. 2. The partial circuit 38 extends from normally open contacts 30 to the ignition system 36, and from the ignition system 36 to an electrical ground G. In alternative embodiments, engine inhibition is provided by breaking power to other devices enabling the engine to run.

Figure 3:
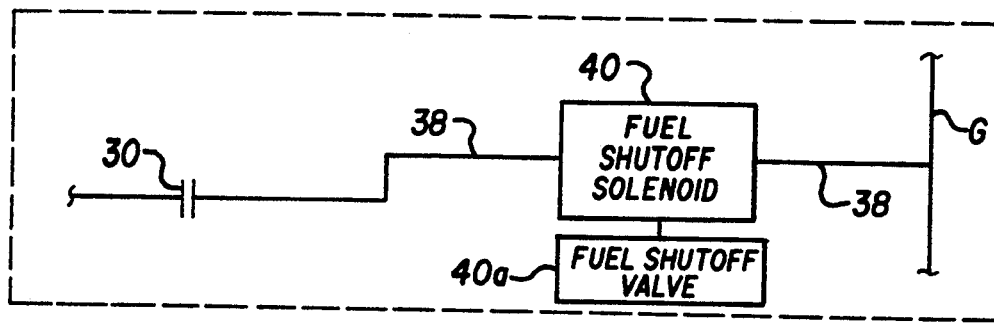
FIG. 3 is a partial electrical schematic diagram of a second embodiment.
Figure 4:
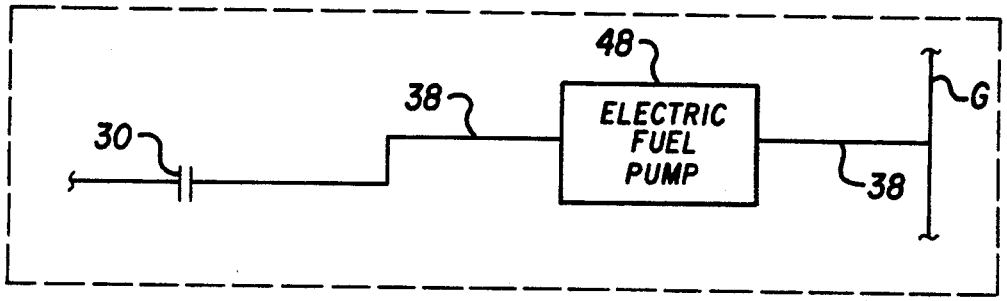
FIG. 4 is a partial electrical schematic diagram of a third embodiment.
Figure 5:
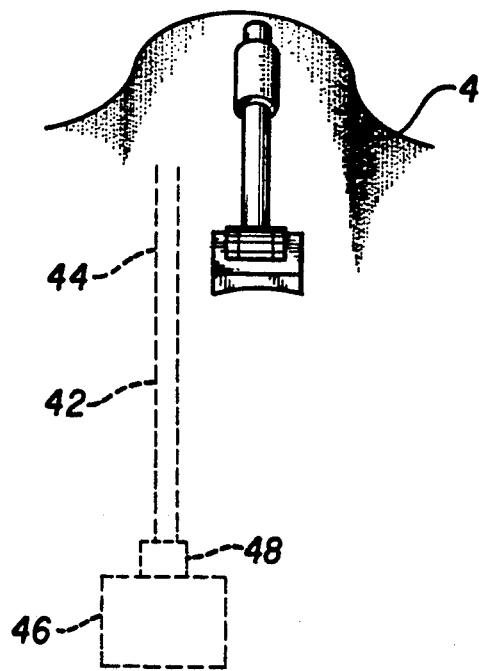
FIG. 5 is a partial interior view of an automobile, showing components of a third embodiment.

In a second embodiment seen in FIGS. 1 and 3, the partial circuit 38 supplies a solenoid 40 opening a fuel shutoff valve 40a, enabling a liquid fuel 42 to flow to the engine (not shown) through a fuel conduit 44 from a fuel storage tank 46 carried aboard the vehicle, comprising another engine enabling device. In a third embodiment, seen in FIGS. 4 and 5, the engine enabling device fed by partial circuit 38 comprises an electric fuel pump 48 forcing liquid fuel 42 to the engine from the fuel storage tank 46.

When the timer 26 breaks the circuits to the indicating lamp 20 and to relay EM1 22, the indicating lamp 20 extinguishes. (Again, power to relay EM1 22 is maintained by holding contact 28.) Simultaneously, power is supplied to the engine starting system 52 through the third set of normally open contacts 32. The engine starting system 52 is then initiated conventionally upon the ignition switch 14 being moved to the "Start" position.

If the initiating device 10 has not been properly set to its appropriate combination, then, upon operation of the ignition switch 14 by a key 16, the set of normally closed contacts 34 completes a circuit to a solenoid EM2 54 and to audible and visible alarms 56,58. This occurs whether an unauthorized user has obtained a key 16 to operate the ignition switch 14 or whether power has been tapped from the battery 8 via an improvised circuit.

Solenoid EM2 54 operates a release valve 60 which releases a partially incapacitating substance 62, such as tear gas, from a storage canister 64, through a conduit 66, a tee fitting 68, an intermediate conduit 70, the release valve 60, and a discharge conduit 72 to the interior 6 of the vehicle. Also upon improper startup, the first, second and third sets of normally open contacts 28,30,32 remain open, denying current to the engine starting system 52.

But where proper startup procedure is followed by an authorized user, upon the energization of relax EM1 22, normally open contacts 28,30,32 complete their respective circuits to the ignition system 36 (or, in the case of alternative embodiments, to the fuel shutoff valve 40a, or to the electric fuel pump 48) and to the engine starting system 52, and the set of normally closed contacts 34 breaks the circuit to solenoid EM2 54 and to the audible and visible alarms 56,58.

Recharging the storage canister 64 may be accomplished by connecting a pressurized source 76 of incapacitating substance 62 to a recharge conduit 74 having an exposed, accessible end 80. A check valve 78 ensures that incapacitating substance 62 cannot escape into the interior 6 of the vehicle through the recharge conduit 74.

As may be seen in FIG. 1, the initiating device 10, the visible alarm 58, and the exposed 80 end of the recharge conduit 74 are visible in their respective mounted positions on the dashboard 2. The fuel shutoff valve 40a is mounted concealed in the raised floor portion 4 of the vehicle. Remaining components are concealed behind the dashboard 2, as is interconnecting wiring required to complete electrical communication among the respective components, with some wiring running concealed to the previously mentioned items concealed in the raised floor section It is to be understood that the present invention is not limited to the sole embodiments described above, but encompasses any and all embodiments within the scope of the following claims.

I claim:

1. In a security system for a vehicle having an ignition switch in an ignition circuit controlling an engine supplied with fuel as delivered by a conduit from a fuel tank, the improvement comprising:

control means selectively operable to supply and deny electrical power to an engine enabling device requiring electrical power to enable the engine, alarm means operable to signal unauthorized attempts to operate the vehicle, discharging means operable to incapacitate an unauthorized person attempting to operate the vehicle and including tear gas release means, a tear gas receptacle and pressurized tear gas contained within said tear gas receptacle, said tear gas receptacle communicating with the vehicle interior by a second conduit, said second conduit being selectively opened and closed by a solenoid actuated valve means connected to said second conduit, access means including a plurality of individually selectable and activatable elements operable in a prearranged sequence to enable authorized operation of the vehicle, and circuit means connecting said ignition circuit with said access means, said alarm means and said discharging means, whereby any attempt by an unauthorized person to manipulate said ignition switch to activate said ignition circuit without individually selecting and activating said access means plurality of elements in said prearranged sequence prevents operation of the vehicle engine by maintaining said ignition circuit open while operating said alarm means and said discharging means and operates said solenoid actuated valve means to open said second conduit, so tear gas is discharged into the vehicle interior.

2. A security system according to claim 1 wherein said engine enabling device comprises an ignition system.

3. A security system according to claim 1 wherein said engine enabling device comprises an electric fuel pump.

4. A security system according to claim 1 wherein said engine enabling device comprises fluid valve means disposed within said conduit from said fuel tank, said engine enabling device including a fluid valve operable to cut off fuel flow from said tank to said engine when said of plurality of elements of said access means are not selected and activated in said prearranged sequence.

5. A vehicle anti-theft security system for a vehicle having an ignition switch in an ignition circuit controlling an engine supplied with fuel as delivered by a conduit from a fuel tank, comprising:
- control means selectively operable to supply and deny electrical power to an engine enabling device requiring electrical power to enable the engine,
- alarm means operable to signal unauthorized attempts to operate the vehicle,
- discharging means operable to incapacitate an unauthorized person attempting to operate the vehicle and including incapacitating fluid release means, an incapacitating fluid receptacle and pressurized incapacitating fluid contained within said receptacle, said receptacle communicating with the vehicle interior by a second conduit, said second conduit being selectively opened and closed by a solenoid actuated valve means connected to said second conduit,
- access means including a plurality of individually selectable and activatable elements operable in a prearranged sequence to enable authorized operation of the vehicle, and
- circuit means connecting said ignition circuit with said access means, said alarm means and said discharging means, whereby
- any attempt by an unauthorized person to manipulate said ignition switch to activate said ignition circuit without initially selecting and activating said plurality of elements of said access means in said prearranged sequence, prevents operation of the vehicle engine by maintaining said ignition circuit open while operating said alarm means and said discharging means, and operates said solenoid actuated valve means to open said second conduit, so the pressurized incapacitating fluid is discharged into the vehicle interior.

6. A security system according to claim 1 including a recharge conduit communicating with said tear gas receptacle and having a check valve and an exposed end open to an interior of the vehicle, whereby said check valve prevents discharge of the tear gas into the vehicle interior and thus enables resupply of pressurized tear gas into said receptacle.

7. The vehicle anti-theft security system according to claim 5 wherein said engine enabling device comprises an ignition system.

8. The vehicle anti-theft security system according to claim 5 wherein said engine enabling device comprises an electric fuel pump.

9. The vehicle anti-theft security system according to claim 5 wherein said engine enabling device comprises fluid valve means disposed within said conduit from said fuel tank,
- said engine enabling device including a fluid valve operable to cut off fuel flow from said tank to said engine when said of plurality of elements of said access means are not selected and activated in said prearranged sequence.

10. The vehicle anti-theft security system according to claim 5 further comprising:
- a recharge conduit communicating with said incapacitating fluid receptacle and having a check valve and an exposed end open to an interior of the vehicle, said check valve prevents discharge of the incapacitating fluid into the vehicle interior and thus enables resupply of pressurized incapacitating fluid into said receptacle.

* * * * *